(12) United States Patent
In et al.

(10) Patent No.: US 11,630,912 B2
(45) Date of Patent: Apr. 18, 2023

(54) SYSTEM AND METHOD FOR CONTROLLING TRANSACTION DATA ACCESS

(71) Applicant: ELECTRONICS AND TELECOMMUNICATIONS RESEARCH INSTITUTE, Daejeon (KR)

(72) Inventors: Min Kyo In, Daejeon (KR); Won Suk Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 133 days.

(21) Appl. No.: 17/205,959

(22) Filed: Mar. 18, 2021

(65) Prior Publication Data

US 2021/0294915 A1 Sep. 23, 2021

(30) Foreign Application Priority Data

Mar. 18, 2020 (KR) .................. 10-2020-0033381

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *H04L 9/14* (2013.01); *H04L 9/30* (2013.01); *G06F 2221/2113* (2013.01)

(58) Field of Classification Search
CPC ............ G06F 21/6227; G06F 21/602; G06F 2221/2113; G06F 21/606; G06F 21/64;
(Continued)

(56) References Cited

U.S. PATENT DOCUMENTS 11,308,241 B2 * 4/2022 Chen .................. H04L 9/0825
2003/0120949 A1 * 6/2003 Redlich ............ C07K 14/70575
726/21

(Continued)

FOREIGN PATENT DOCUMENTS

KR 101590076 B1 2/2016
KR 101957064 B1 3/2019
(Continued)

OTHER PUBLICATIONS

Jeong-Hyuk Lee et al. "Personal Information Management System with Blockchain Using zk-SNARK", Journal of the Korea Institute of Information Security & Cryptology, Apr. 1, 2019, pp. 299-308, vol. 29(2), Korea Institute Of Information Security And Cryptology.
(Continued)

*Primary Examiner* — Abiy Getachew

(57) ABSTRACT

Provided are a system and a method for controlling transaction data access. A system for controlling transaction data access comprising: a transaction management module configured to determine a plurality of security levels for transaction data; a data encryption module configured to perform multiple level encrypting the transaction data according to the plurality of security levels; and a data storage module configured to store the encrypted data as a block, and provide the block to a peer-to-peer (P2P) network.

20 Claims, 9 Drawing Sheets

(51) Int. Cl.
*H04L 9/30* (2006.01)
*H04L 9/14* (2006.01)

(58) Field of Classification Search
CPC ..... H04L 9/14; H04L 9/30; H04L 9/50; H04L 9/3239; H04L 63/105; H04L 9/0825; H04L 9/0877; H04L 9/0894; H04L 63/0478; H04L 67/104
See application file for complete search history.

(56) References Cited

U.S. PATENT DOCUMENTS

| | | |
|---|---|---|
| 2019/0075102 A1 | 3/2019 | Kim et al. |
| 2019/0182029 A1 | 6/2019 | Yim et al. |
| 2019/0253434 A1* | 8/2019 | Biyani .................. H04L 63/126 |
| 2022/0014351 A1* | 1/2022 | Jung ..................... H04L 9/0894 |

FOREIGN PATENT DOCUMENTS

| | | |
|---|---|---|
| KR | 20190101532 A | 9/2019 |
| WO | WO2019164260 A1 | 8/2019 |

OTHER PUBLICATIONS

Minkyo In et al., "Y.BaaS-reqts: proposal update text for use case 1.2 and 1.4", Jul. 20-31, 2020, pp. 1-5, Electronics and Telecommunications Research Institute.

Min Kyo In et al., "Cloud computing—Functional requirements for blockchain as a service", Sep. 1, 2020, pp. 1-29, Telecommunication Standardization Sector Of ITU-T.

\* cited by examiner

| INDEX LENGTH (601) | NUMBER OF DATA (602) | LENGTH OF FIRST DATA (603) | LENGTH OF SECOND DATA (604) | ... | LENGTH OF NTH DATA (605) |

SYSTEM AND METHOD FOR CONTROLLING TRANSACTION DATA ACCESS

CROSS-REFERENCE TO RELATED APPLICATION

This application claims priority to and the benefit of Korean Patent Application No. 10-2020-0033381 filed in the Korean Intellectual Property Office on Mar. 18, 2020, the entire contents of which are incorporated herein by reference.

BACKGROUND OF THE DISCLOSURE (a) Field of the Disclosure

The present disclosure relates to a system and a method for controlling transaction data access.

(b) Description of the Related Art

Blockchain technology is a data management technology in which data is stored in blocks of a specific unit, nodes participating in a peer-to-peer (P2P) network duplicate and store the blocks, and manage the blocks in a data structure chained through hash values. The consensus process is an operation that verifies transactions and blocks by all nodes belonging to the P2P network, and the integrity and security of the transactions can be guaranteed through the consensus process. Specifically, in the blockchain technology, transactions are not stored on a centralized server, the transactions are shared with all participating nodes, and, every time a transaction occurs, all participating nodes can compare the shared information, thus data forgery or data tampering can be prevented.

However, the content disclosed to the all participating nodes may include sensitive data requiring security such as personal information and confidential information, and these data need to be disclosed only to users who have been granted permission to legitimately view the data.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a system and a method for controlling transaction data access having advantages of being able to encrypt transaction data using public key cryptography to protect the transaction data stored in a blockchain and provide the decrypted transaction data only to the authorized users.

Also, the present disclosure has been made in an effort to provide a system and a method for controlling transaction data access having advantages of being able to determine security levels for transaction data, perform multiple level encrypting the transaction data according to the security levels, and perform multiple level decrypting the transaction data encrypted in accordance with the authorities granted according to the security levels.

An example embodiment of the present disclosure provides a system for controlling transaction data access including: a transaction management module configured to determine a plurality of security levels for transaction data; a data encryption module configured to perform multiple level encrypting the transaction data according to the plurality of security levels; and a data storage module configured to store the encrypted data as a block, and provide the block to a peer-to-peer (P2P) network.

According to an embodiment of the present disclosure, the transaction data may include a first data and a second data, the transaction management module may determine the security level of the first data as a first security level, and determines the security level of the second data as a second security level, and the data encryption module may generate a first index based on the first data and the second data, generates a first data set by concatenating the first index with the first data and the second data, and generates a first encrypted data by encrypting the first index and the first data with a first public key corresponding to the first security level.

According to an embodiment of the present disclosure, the first index may include information on a number of data in the first data set or a length of data.

According to an embodiment of the present disclosure, the data encryption module may generate a second index based on the first encrypted data and the second data, generate a second data set by concatenating the second index with the first encrypted data and the second data, and generate a second encrypted data by encrypting the second index, the first encrypted data, and the second data with a second public key corresponding to the second security level.

According to an embodiment of the present disclosure, the transaction data may further include a third data, the transaction management module may determine the security level of the third data as a third security level, and the data encryption module may generate a third index based on the second encrypted data and the third data, generate a third data set by concatenating the third index with the second encrypted data and the third data, and generate a third encrypted data by encrypting the third index, the second encrypted data, and the third data with a third public key corresponding to the third security level.

According to an embodiment of the present disclosure, the system may further include a data access request module configured to send an access request for the transaction data to the transaction management module and receive a level key from the transaction management module.

According to an embodiment of the present disclosure, the system may further include a data decryption module configured to perform multiple level decrypting the encrypted data using the level key.

According to an embodiment of the present disclosure, the level key may include a third level key, and the data decryption module may obtain a third data set by decrypting a third encrypted data with the third level key, separate a second encrypted data from the third data set based on a third index, and restore a third data.

According to an embodiment of the present disclosure, the level key may include a second level key, and the data decryption module may obtain a second data set by decrypting a second encrypted data with the second level key, separate a first encrypted data from the second data set based on a second index, and restore a second data.

According to an embodiment of the present disclosure, the level key may include a first level key, and the data decryption module may obtain a first data set by decrypting a first encrypted data with the first level key, and restore a first data from the first data set based on a first index.

An example embodiment of the present disclosure provides a system for controlling transaction data access including: a data encryption module configured to perform multiple level encrypting the transaction data using a plurality of public keys; a data storage module configured to store the encrypted data as a block, and provide the block to a P2P network; and a data decryption module configured to perform multiple level decrypting the encrypted data using a plurality of level keys generated in a pair with the plurality of public keys.

According to an embodiment of the present disclosure, the transaction data may include a first data and a second data, and the data encryption module may generate a first encrypted data by encrypting the first data with a first public key, and generate a second encrypted data by encrypting the first encrypted data and the second data with a second public key.

According to an embodiment of the present disclosure, the data decryption module may separate the first encrypted data by decrypting the second encrypted data with a second level key, and restore the second data.

According to an embodiment of the present disclosure, the data decryption module may restore the first data by decrypting the first encrypted data with a first level key.

An example embodiment of the present disclosure provides a method for controlling transaction data access including: determining a plurality of security levels for transaction data; performing multiple level encrypting the transaction data according to the plurality of security levels; and storing the encrypted data as a block to provide the block to a peer-to-peer (P2P) network.

According to an embodiment of the present disclosure, the transaction data may include a first data and a second data, the determining the plurality of security levels comprises, determining the security level of the first data as a first security level, and determining the security level of the second data as a second security level, and the performing multiple level encrypting comprises, generating a first index based on the first data and the second data, generating a first data set by concatenating the first index with the first data and the second data, and generating a first encrypted data by encrypting the first index and the first data with a first public key corresponding to the first security level.

According to an embodiment of the present disclosure, the performing multiple level encrypting further comprises, generating a second index based on the first encrypted data and the second data, generating a second data set by concatenating the second index with the first encrypted data and the second data, and generating a second encrypted data by encrypting the second index, the first encrypted data, and the second data with a second public key corresponding to the second security level.

According to an embodiment of the present disclosure, the method further including: performing multiple level decrypting the encrypted data using the level key.

According to an embodiment of the present disclosure, the level key may include a third level key, and the performing multiple level decrypting further comprises, obtaining a third data set by decrypting a third encrypted data with the third level key, separating a second encrypted data from the third data set based on a third index, and restoring a third data.

According to an embodiment of the present disclosure, the level key may include a second level key, and the performing multiple level decrypting further comprises, obtaining a second data set by decrypting a second encrypted data with the second level key, separating a first encrypted data from the second data set based on a second index, and restoring a second data.

BRIEF DESCRIPTION OF THE DRAWINGS

FIG. 5 illustrates an implementation example of an index used in a system for controlling transaction data access according to an embodiment of the present disclosure.

DETAILED DESCRIPTION OF THE EMBODIMENTS

Figure 1:
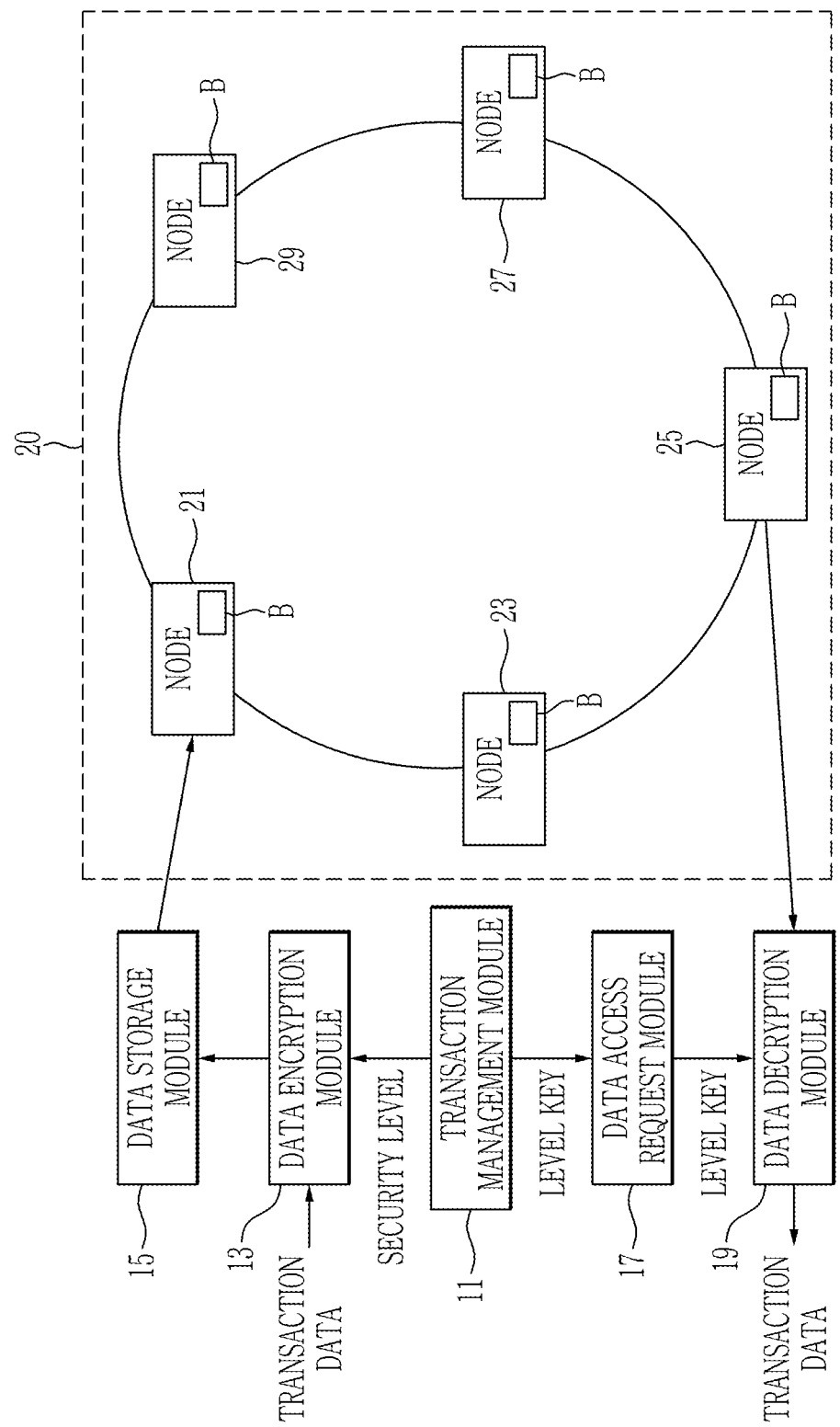
FIG. 1 illustrates a system for controlling transaction data access according to an embodiment of the present disclosure.

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein.

In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements. In addition, terms such as " . . . unit", " . . . group", and "module" described in the specification mean a unit that processes at least one function or operation, and it can be implemented as hardware or software or a combination of hardware and software.

FIG. 1 illustrates a system for controlling transaction data access according to an embodiment of the present disclosure.

A system for controlling transaction data access described herein may be implemented with one or more computing devices. The computing device may be, for example, a smart phone, a smart watch, a smart band, a tablet computer, a notebook computer, a desktop computer, a server, etc., but the scope of the present disclosure is not limited thereto, and may include any type of computer device having a processor and memory capable of storing and executing computer instructions.

The functions of the system for controlling transaction data access may all be implemented on a single computing device, or may be implemented separately on a plurality of computing devices. For example, the plurality of computing devices may include a first computing device and a second computing device, and some functions of the system for controlling transaction data access are implemented on the first computing device, and some other functions of the system for controlling transaction data access may be implemented on the second computing device. The first computing device and the second computing device may communicate with each other through a network.

Here, the network includes a wireless network including a cellular network, a Wi-Fi network, a Bluetooth network, a wired network including a local area network (LAN), a wide local area network (WLAN), or a combination of a wireless network and a wired network, however, the scope of the present disclosure is not limited thereto.

Referring to FIG. 1, a system 1 for controlling transaction data access according to an embodiment of the present disclosure may include a transaction management module 11, a data encryption module 13, a data storage module 15, a data access request module 17, a data decryption module 19 and a P2P network 20.

First of all, the P2P network 20 will be described, and the P2P network 20 may include nodes 21, 23, 25, 27, and 29, and the nodes 21, 23, 25, 27, and 29 may store transactions, share the transactions by a distributed consensus process, or execute or approve the transactions.

There are various ways of consensus between nodes 21, 23, 25, 27, and 29 participating in the P2P network 20. Representatively, there is a Proof of Work (PoW) algorithm used in Bitcoin and Ethereum, which is a method of calculating and verifying a hash value of a specific difficulty, i.e., Nonce, using computing power. Proof of Stake (PoS) is an algorithm that becomes more advantageous as the nodes participating in the network have more coins stake, and has the advantage of using less computing power than the Proof of Work (PoW) algorithm.

Recently, the Delegated Proof of Stake (DPoS) algorithm has been widely used. According to the Delegated Proof of Stake (DPoS) algorithm, nodes 21, 23, 25, 27, and 29 participating in the P2P network 20 will have voting rights based on the stakes (for example, coins) they hold, and the entire network participant elects representative nodes to carry out consensus, through voting based on their stakes. Through this, a more centralized blockchain system is implemented, and nodes that are elected through voting play a role of creating or verifying the ledger, so that computing power can be concentrated on the elected nodes, and faster operation of the blockchain system is possible.

The nodes 21, 23, 25, 27, and 29 may include a transaction storage database and an application database. The transaction storage database is a database that stores lists of correct transactions, and the application database is a database that applies the stored transactions to applications.

The transaction storage database may have a structure in which blocks are chained or linked, that is, a block chain structure. Each block includes an ordered list of transaction, and each block can be linked in chronological order. Using such a block chain structure, the order of all transaction can be determined.

In the P2P network 20, nodes 21, 23, 25, 27, and 29 do not perform transactions from one node to another, but while all nodes 21, 23, 25, 27, and 29 participating in blockchain transaction maintain the same ledger, each of the nodes 21, 23, 25, 27, and 29 can operate by updating their database by applying transactions. For more details on such a block chain transaction, a reference may be made to documents related to known block chain technology, and thus the description thereof will be omitted in this specification.

The transaction management module 11 may determine a plurality of security levels for transaction data. Specifically, the transaction management module 11 may analyze the transaction data and determine a plurality of security levels for the transaction data according to a predetermined criterion.

The transaction management module 11 may divide the transaction data into sensitive data and general data, and provide different security levels to the sensitive data and the general data. For example, the transaction management module 11 may determine the general data as the 0th security level and determine the sensitive data as the first security level. Further, it may be determined that the data determined as the 0th security level does not need to be encrypted, and the data determined as the first security level needs to be encrypted by the data encryption module 13.

Here, the sensitive data may be data requiring security such as personal information and confidential information, and may be data that should be disclosed only to users who have been granted permission to legitimately view the data. That is, the sensitive data may include, for example, personal information, medical information, financial information, and the like. Meanwhile, the general data may mean data that can be disclosed to a user who is not granted any authority.

In addition, the transaction management module 11 divides the transaction data into sensitive data and general data, and further subdivides and classifies the sensitive data, so different security levels can be assigned to the subdivided sensitive data. For example, the transaction management module 11 may determine the general data as the 0th security level and determine the sensitive data as three different security levels. In this case, the transaction management module 11 may determine the security level of some of the sensitive data as the first security level, determine the security level of another of the sensitive data as the second security level, and determine the security level of another of the sensitive data as the third security level.

Then, it is determined that the data determined as the 0th security level does not need to be encrypted, and the data determined as the first security level needs to be encrypted by the data encryption module 13 according to an encryption method corresponding to the first security level. In addition, it is determined that the data determined as the second security level needs to be encrypted by the data encryption module 13 according to an encryption method corresponding to the second security level, and the data determined as the third security level needs to be encrypted by the data encryption module 13 according to an encryption method corresponding to the third security level.

Here, different from the above, the number of security levels may be set to two or four or more. In addition, criteria for setting multiple security levels may vary. For example, a security strength of the first security level may be higher than a security strength of the third security level. In this case, an implementation of the encryption method corresponding to the first security level may be more complex than an implementation of the encryption method corresponding to the third security level. As another example, in order to separately manage users who can access data of the first security level and users who can access data of the third security level, the encryption method corresponding to the first security level may be implemented in a manner different from the encryption method corresponding to the third security level, and the scope of the present disclosure is not limited to these examples.

The data encryption module 13 may perform multiple level encrypting transaction data according to a plurality of security levels determined by the transaction management module 11. For example, the data encryption module 13 may receive a plurality of security levels for the transaction data from the transaction management module 11 through a network or a bus, and then encrypt the transaction data using encryption methods according to the plurality of received security levels. The term "multiple level encryption (encrypting)" as used herein may refer to encryption performed using various encryption methods according to a plurality of security levels as described above.

When the transaction management module 11 determines the general data as the 0th security level and the sensitive data as the first security level, the data encryption module 13 may bypass the data determined as the 0th security level, and only data determined as the first security level can be encrypted.

When the transaction management module 11 determines the general data as the 0th security level and determines the sensitive data as three security levels of the first security level to the third security level, the data encryption module 13 may bypass the data determined as the 0th security level, encrypt the data determined as the first security level according to an encryption method corresponding to the first security level, encrypt the data determined as the second security level according to an encryption method corresponding to the second security level, and encrypt the data determined as the third security level according to an encryption method corresponding to the third security level.

The data encryption module 13 may, to data determined as a plurality of security levels, apply encryption methods different in algorithm concept respectively, or may apply encryption methods having the same algorithm concept but having different parameters, different number of repetitions of some steps, or different execution order of some steps, etc.

For example, the data encryption module 13 may be implemented to apply a symmetric key encryption method for the data determined as the first security level, and apply an asymmetric key encryption method for the data determined as the second security level. Alternatively, the data encryption module 13 may be implemented to apply a public key encryption method using a first public key for the data determined as the first security level, and apply a public key encryption method using a second public key for the data determined as the second security level. Alternatively, the data encryption module 13 may be implemented to apply a public key encryption method using a first public key and a second public key two times for the data determined as the first security level, and apply a public key encryption method using a second public key single time for the data determined as the second security level, and the manner in which the data encryption module 13 applies the encryption method for the data determined with a plurality of security levels is not limited to the examples described herein.

The data storage module 15 may store the data encrypted with multiple level by the data encryption module 13 as a block B and provide the block B to the P2P network 20. Accordingly, the block B including the data encrypted with multiple level may be shared between nodes 21, 23, 25, 27, and 29 participating in the P2P network 20.

The data access request module 17 may request an access to the transaction data to the transaction management module 11 and receive a level key from the transaction management module 11. The data access request module 17 may be implemented as, for example, a client requesting a block B from nodes 21, 23, 25, 27, and 29 of the P2P network 20, but the scope of the present disclosure Is not limited thereto.

Specifically, in order to obtain the transaction data stored in the block B, the data access request module 17 may transmit a data access request to the transaction management module 11, the transaction management module may verify the requester's credentials, register the requester, determine security levels, and then request a public key to the data access request module 17. In response, the data access request module 17 may provide a public key to the transaction management module 11, and the transaction management module 11 may encrypt a level key corresponding to the security level determined by using the public key, and then transmit the encrypted level key to the data access request module 17, but the scope of the present disclosure Is not limited thereto, and the method for the data access request module 17 to receive the level key from the transaction management module 11 may be implemented in various ways.

After receiving the level key from the transaction management module 11, the data access request module 17 may provide the level key to the data decryption module 19 and receive the restored result by the data decryption module to access the transaction data with the authority corresponding to the security level assigned to the level key.

The data decryption module 19 may perform multiple level decrypting the encrypted data using a level key provided from the transaction management module 11. For example, the data decryption module 19 may receive a level key from the transaction management module 11 through a network or a bus, and then decrypt the transaction data using the received level key. The term "multiple level decryption (decrypting)" as used herein may refer to decryption performed using various level keys corresponding to various security levels as described above.

In order for the data access request module 17, which has received the level key from the transaction management module 11, to access the block B stored in the node 25, after receiving the block B from the node 25, the data decryption module 19 may restore the transaction data stored in the block B by using the level key received from the data access request module 17.

When the transaction management module 11 determines the general data as the 0th security level and determines the sensitive data as the first security level, if the level key received from the data access request module 17 is the first level key corresponding to the first security level, the data decryption module 19 may decrypt the encrypted data with the first level key.

When the transaction management module 11 determines the general data as the 0th security level and determines the sensitive data as three different security levels of the first security level to the third security level, if the level key received from the data access request module 17 is the third level key corresponding to the third security level, the data decryption module 19 may decrypt the encrypted data corresponding to the third security level with the third level key, but cannot decrypt the encrypted data corresponding to the first and second security levels. Alternatively, if the level keys received from the data access request module 17 are the second and third level keys corresponding to the second and third security levels, the data decryption module 19 may decrypt the encrypted data corresponding to the second and third security levels with the second and third level keys, but cannot decrypt the encrypted data corresponding to the first security level.

In this way, the transaction data restored by the data decryption module 19 may be provided to a user of a client requesting the transaction.

Figure 2:
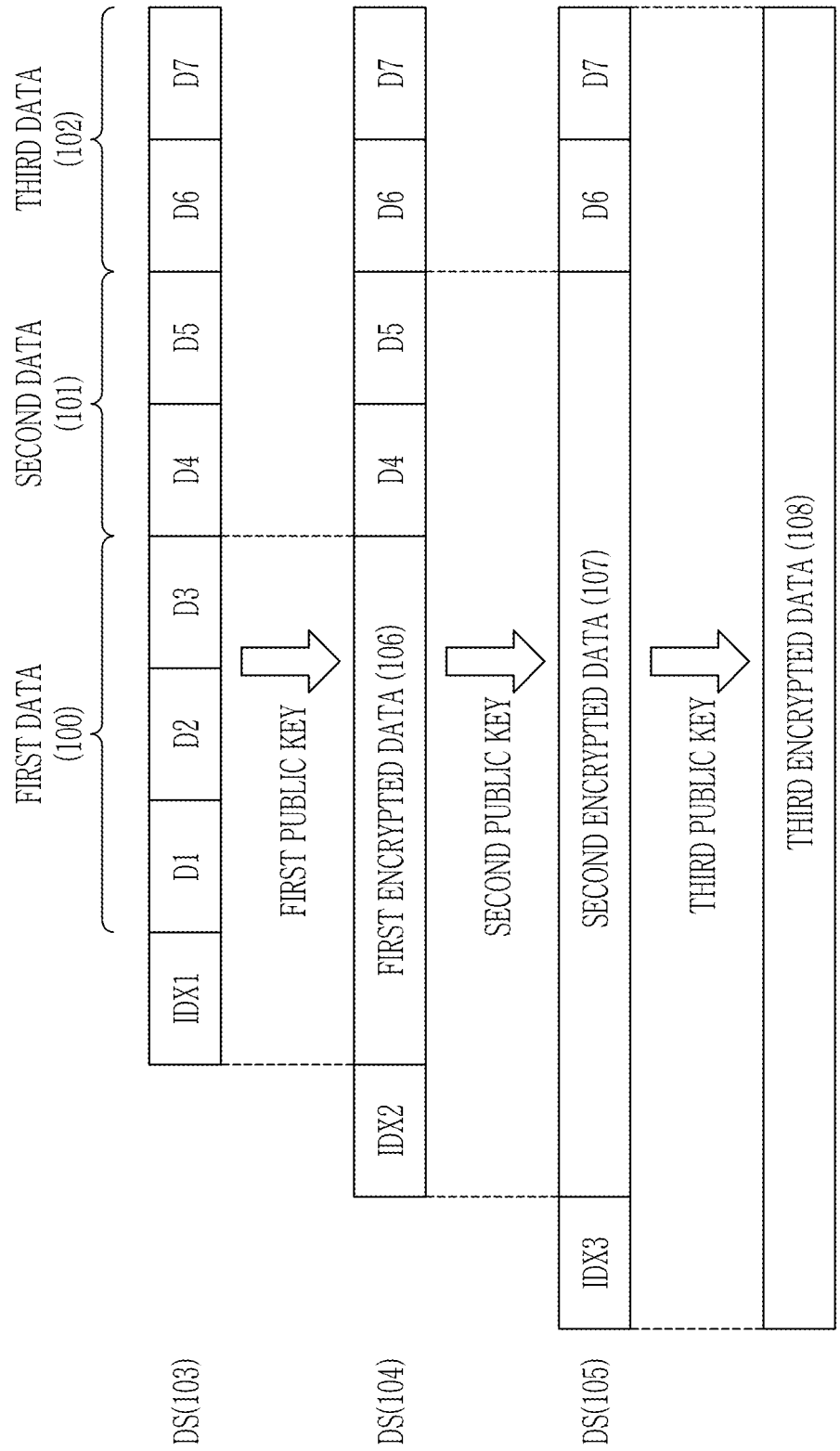
FIG. 2 illustrates a data encryption module of a system for controlling transaction data access according to an embodiment of the present disclosure.

FIG. 2 illustrates a data encryption module of a system for controlling transaction data access according to an embodiment of the present disclosure.

Referring to FIG. 2, the data encryption module 13 of the system for controlling transaction data access according to an embodiment of the present disclosure may perform multiple level encrypting transaction data according to a first security level to a third security level. In the present embodiment, it may be assumed that the first security level is the highest security level and the third security level is the lowest security level.

In the present embodiment, the transaction data may include the first data 100, the second data 101 and the third data 102. And the first data 100 may include data pieces D1 to D3, the second data 101 may include data pieces D4 and D5, and the third data 102 may include data pieces D6 and D7.

In addition, it is assumed that the transaction management module 11 determines the first data 100 as a first security level corresponding to the highest security level, and determines the second data 101 as a second security level corresponding to the intermediate security level, and the third data 102 as a third security level corresponding to the lowest security level.

First, the data encryption module 13 may generate a first index IDX1 based on the first data 100, the second data 101, and the third data 102. Then, the data encryption module 13 may generate a first data set 103 by concatenating the first index IDX1 with the first data 100, the second data 101, and the third data 102. Here, the first index IDX1 may include information on the number of data included in the first data set 103 or length of data, and, for example, the first index IDX1 may be located in front of the first data 100, the second data 101, and the third data 102.

Thereafter, the data encryption module 13 may generate a first encrypted data 106 by encrypting the first index IDX1 and the first data 100 with a first public key corresponding to the first security level. The first encrypted data 106 may be decrypted by using a level key corresponding to the first security level, where the level key may include a private key generated in pairs with the first public key.

Next, the data encryption module 13 may generate a second index IDX2 based on the first encrypted data 106, the second data 101, and the third data 102. Then, the data encryption module 13 may generate a second data set 104 by concatenating the second index IDX2 with the first encrypted data 106, the second data 101, and the third data 102. Here, the second index IDX2 may include information on the number of data included in the second data set 104 or length of data, and, for example, the second index IDX2 may be located in front of the first encrypted data 106, the second data 101, and the third data 102.

Thereafter, the data encryption module 13 may generate a second encrypted data 107 by encrypting the second index IDX2, the first encrypted data 106, and the second data 101 with a second public key corresponding to the second security level. The second encrypted data 107 may be decrypted by using a level key corresponding to the second security level, where the level key may include a private key generated in pairs with the second public key.

Next, the data encryption module 13 may generate a third index IDX3 based on the second encrypted data 107 and the third data 102. Then, the data encryption module 13 may generate a third data set 105 by concatenating the third index IDX3 with the second encrypted data 107 and the third data 102. Here, the third index IDX3 may include information on the number of data included in the third data set 105 or length of data, and, for example, the third index IDX3 may be located in front of the second encrypted data 107 and the third data 102.

Thereafter, the data encryption module 13 may generate a third encrypted data 108 by encrypting the third index IDX3, the second encrypted data 107, and the third data 102 with a third public key corresponding to the third security level. The third encrypted data 108 may be decrypted by using a level key corresponding to the third security level, where the level key may include a private key generated in pairs with the third public key.

The data storage module 15 may store the data encrypted with multiple level by the data encryption module 13 in the manner described above as a block B and provide the block B to the P2P network 20 (for example, node 21 of FIG. 1), and, the block B including the data encrypted with multiple level may be shared between nodes 21, 23, 25, 27, and 29 participating in the P2P network 20.

Figure 3:
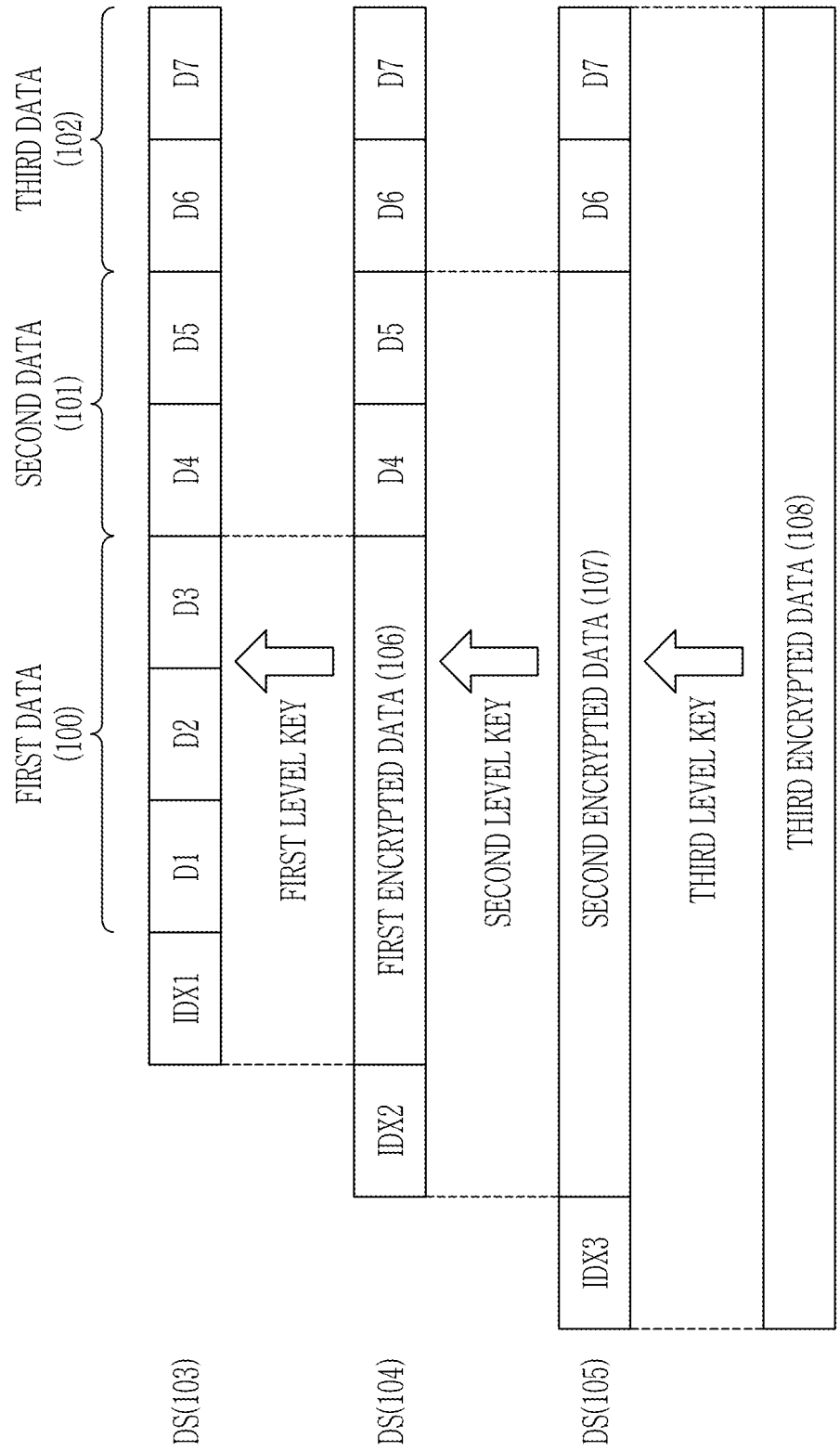
FIG. 3 illustrates a data decryption module of a system for controlling transaction data access according to an embodiment of the present disclosure.

FIG. 3 illustrates a data decryption module of a system for controlling transaction data access according to an embodiment of the present disclosure.

Referring to FIG. 3, the data decryption module 19 of the system for controlling transaction data access according to an embodiment of the present disclosure may perform multiple level decrypting the encrypted data according to a first security level to a third security level. In the present embodiment, it may be assumed that the first security level is the highest security level and the third security level is the lowest security level.

The first client, using the data access request module 17, may request an access to the third data 102 among the transaction data to the transaction management module 11, and receive a third level key corresponding to the third security level from the transaction management module 11. In addition, the first client may include a data decryption module 19, receive a block B from the P2P network 20 (for example, node 25 of FIG. 1), and access the third data 102 among the transaction data from the block B.

The data decryption module 19 may obtain the third data set 105 by decrypting the third encrypted data 108 of the transaction data of the block B with a third level key. Then, the data decryption module 19 may separate the second encrypted data 107 based on the third index IDX3 of the third data set 105, and restore the third data 102. The restored third data 102 may be provided to the user of the first client.

Alternately, the second client, using the data access request module 17, may request an access to the second data 101 among the transaction data to the transaction management module 11, and receive a second level key and a third level key corresponding to the second security level and the third security level from the transaction management module 11. In addition, the second client may include a data decryption module 19, receive a block B from the P2P network 20 (for example, node 25 of FIG. 1), and access the second data 101 among the transaction data from the block B.

The data decryption module 19 may obtain the third data set 105 by decrypting the third encrypted data 108 of the transaction data of the block B with a third level key. Then, the data decryption module 19 may separate the second encrypted data 107 based on the third index IDX3 of the third data set 105, and restore the third data 102.

Subsequently, the data decryption module 19 may obtain the second data set 104 by decrypting the second encrypted data 107 with the second level key. Then, the data decryption module 19 may separate the first encrypted data 106 based on the second index IDX2 of the second data set 104, and restore the first data 101. The restored second data 101 may be provided to the user of the second client.

Alternately, the third client, using the data access request module 17, may request an access to the first data 100 among the transaction data to the transaction management module 11, and receive a first level key to a third level key corresponding to the first security level to the third security level from the transaction management module 11. In addition, the third client may include a data decryption module 19, receive a block B from the P2P network 20 (for example, node 25 of FIG. 1), and access the first data 100 among the transaction data from the block B.

The data decryption module 19 may obtain the third data set 105 by decrypting the third encrypted data 108 of the transaction data of the block B with a third level key. Then, the data decryption module 19 may separate the second encrypted data 107 based on the third index IDX3 of the third data set 105, and restore the third data 102.

Subsequently, the data decryption module 19 may obtain the second data set 104 by decrypting the second encrypted data 107 with the second level key. Then, the data decryption module 19 may separate the first encrypted data 106 based on the second index IDX2 of the second data set 104, and restore the first data 101.

Subsequently, the data decryption module 19 may obtain the first data set 103 by decrypting the first encrypted data 106 with the first level key. Then, the data decryption module 19 may restore the first data 100 based on the first index IDX1 of the first data set 103. The restored first data 100 may be provided to the user of the second client.

According to the embodiments of the present disclosure described so far, in a situation in which all participating nodes share transactions, it is possible to increase the security for sensitive data such as personal information and confidential information that may be included in the transaction.

Also, according to embodiments of the present disclosure, by operating various security levels for sensitive data, transactions can be accessed only by users who have been granted permission according to the security levels. In addition, by diversifying the security levels within one data set, even if the sensitive data and general data are included in one data set, only sensitive data can be separately protected, so security policy can be operated in a sophisticated and detailed manner.

Figure 4:
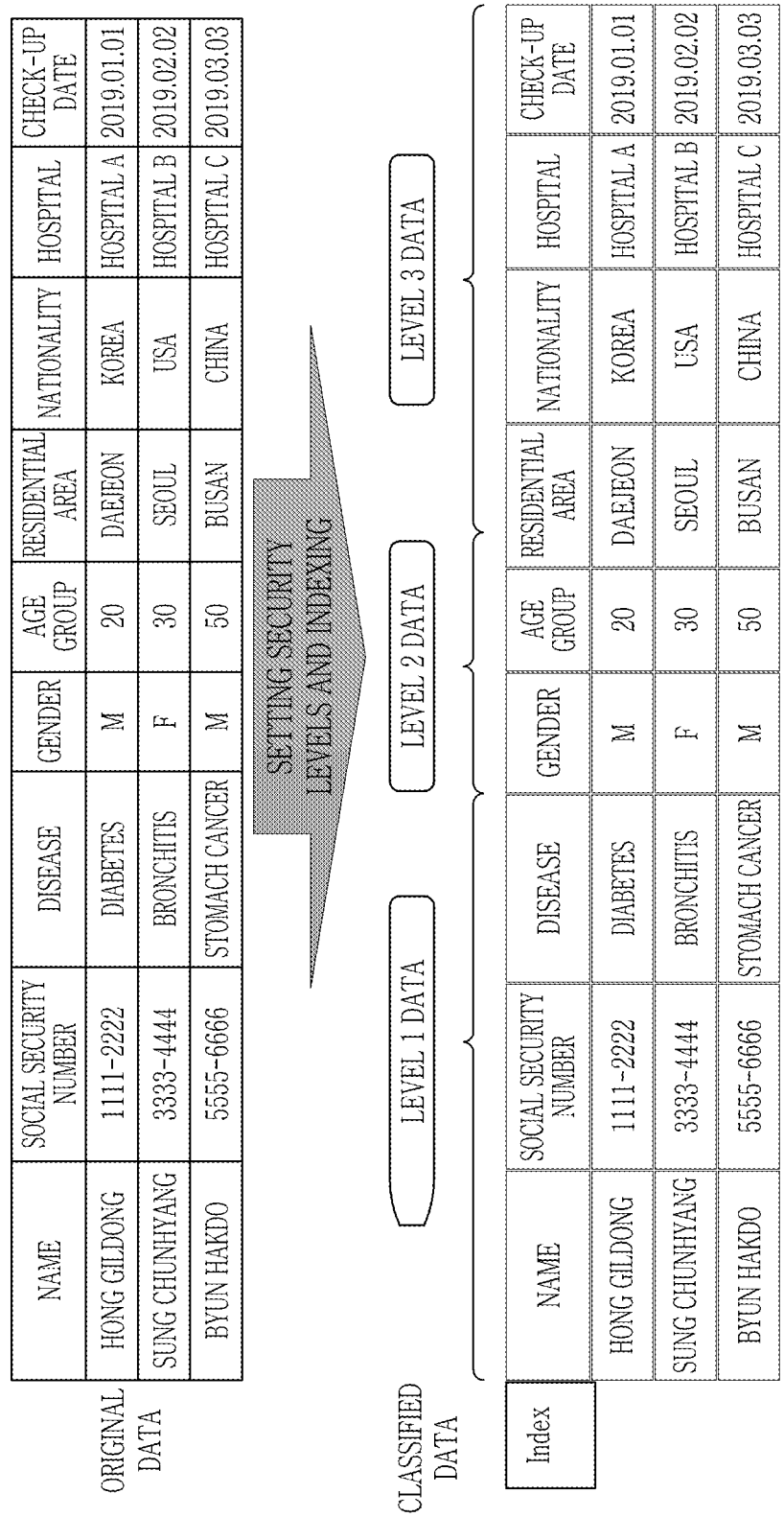
FIG. 4 illustrates an example to which a system and a method for controlling transaction data access according to an embodiment of the present disclosure are applied.

FIG. 4 illustrates an example to which a system and a method for controlling transaction data access according to an embodiment of the present disclosure are applied.

Referring to FIG. 4, a system and method for controlling transaction data access according to an embodiment of the present disclosure may be applied to medical information including various kinds of medical data. For medical data, three levels of data were considered, and among the medical information, very important medical data is set to a first security level, relatively less important medical data is set to a second security level, and the least important medical data is set to a third security level.

Three levels of security may be assigned to the data, and the index may include length information of the data for three items (name, social security number, disease) for which the first security level is assigned, length information of the data for two items (gender, age group) for which the second security level is assigned, and length information of the data for four items (residential area, nationality, hospital, check-up date) for which the third security level is assigned.

In the system and method for controlling transaction data access according to an embodiment of the present disclosure, level 1 data (i.e., data for which the first security level is assigned) is first encrypted with a first public key, and the result and level 2 data (i.e., data for which the second security level is assigned) are combined and encrypted with a second public key. Then, the result and level 3 data (i.e., data for which the third security level is assigned) can be combined, encrypted with a third public key, and then stored in the blockchain.

FIG. 5 illustrates an implementation example of an index used in a system for controlling transaction data access according to an embodiment of the present disclosure.

Referring to FIG. 5, an index 60 used in the system for controlling transaction data access according to an embodiment of the present disclosure may include an index length 601, a number of data 602, and data length information 603 to 605.

The index length 601 may indicate the length of the index 60. The index length 601 field may have a fixed length or a variable length, and may be, for example, 16 bytes.

The number of data 602 may indicate the number of data classified. For example, referring to FIG. 2, the number of data 602 of the first index IDX1 of the first data set 103 may be 7, which corresponds to the number of data pieces D1 to D7. In addition, the number of data 602 of the second index IDX2 of the second data set 104 may be 5, which corresponds to the number of the first encrypted data 106 and the data pieces D4 to D7. In addition, the number of data 602 of the third index IDX3 of the third data set 105 may be 5, which corresponds to the number of the second encrypted data 107 and the data pieces D6 to D7. The number of data 602 field may have a fixed length or a variable length, and may be, for example, 16 bytes.

The data length information 603 to 605 may indicate each length of classified data. For example, referring to FIG. 2, in the case of the first data set 103, the data length information 603 may indicate length information of the data piece D1, the data length information 604 may indicate length information of the data piece D2, and the data length information 605 may indicate length information of the data piece D7. In addition, in the case of the second data set 104, the data length information 603 may indicate length information of the first encrypted data 106, the data length information 604 may indicate length information of the data piece D4, and the data length information 605 may indicate length information of the data piece D7. In addition, in the case of the third data set 105, the data length information 603 may indicate length information of the second encrypted data 107, the data length information 604 may indicate length information of the data piece D6, and the data length information 605 may indicate length information of the data piece D7. Each of the data length information 603 to 605 fields may have a fixed length or a variable length, and may be, for example, 16 bytes.

In such an index 60, the data decryption module 19 may be used to, based on the third index IDX3 of the third data set 105, separate the second encrypted data 107 and restore the third data 102; based on the second index IDX2 of the second data set 104, separate the first encrypted data 106 and restore the second data 101; and, based on the first index IDX1 of the first data set 103, restore the first data 100. However, the specific implementation method of the index 60 is not limited to that shown in FIG. 5, and the implementation method may vary according to a specific implementation purpose.

Figure 6:
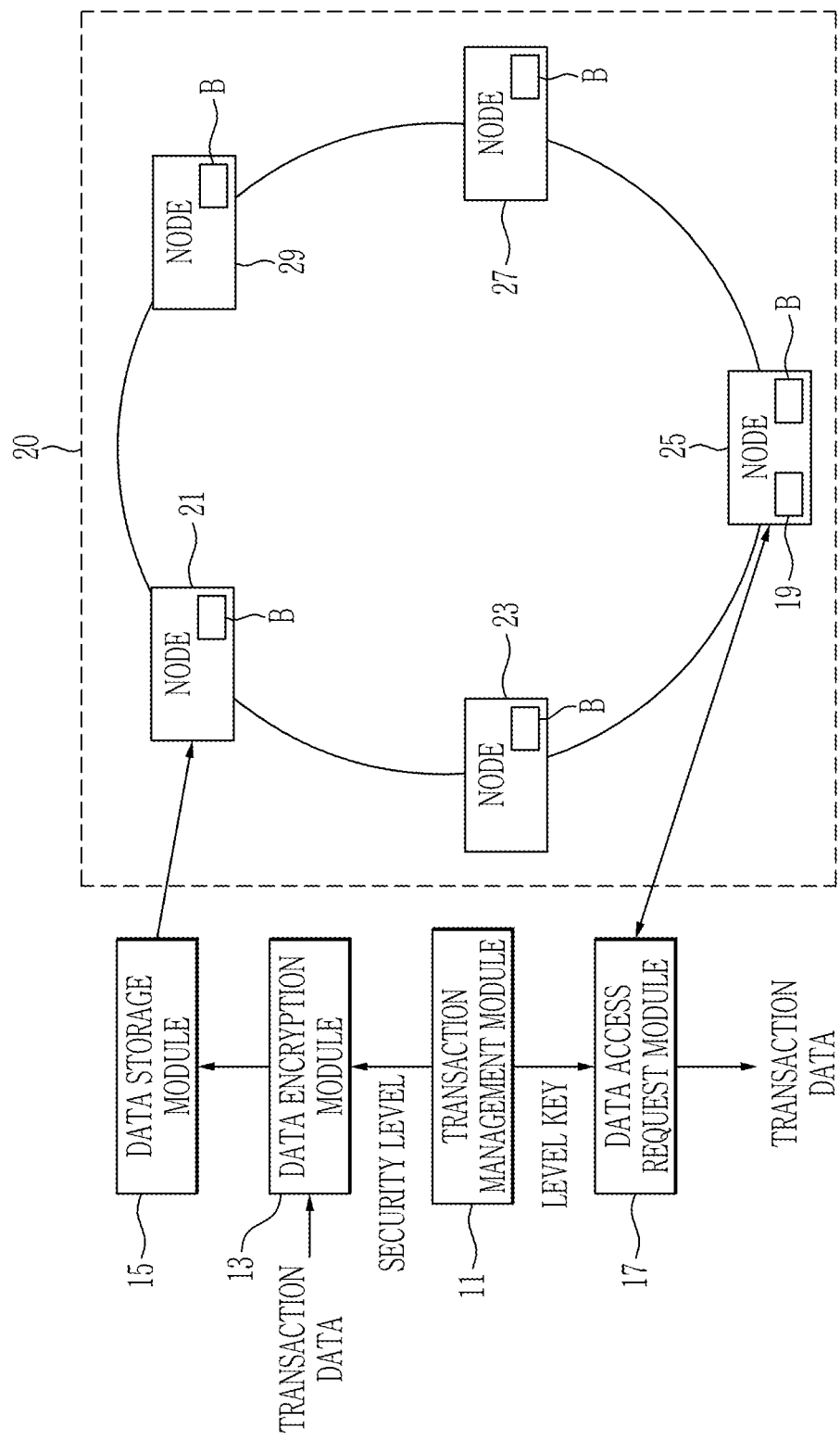
FIG. 6 illustrates a system for controlling transaction data access according to an embodiment of the present disclosure.

FIG. 6 illustrates a system for controlling transaction data access according to an embodiment of the present disclosure.

Referring to FIG. 6, a system 2 for controlling transaction data access according to an embodiment of the present disclosure may include a transaction management module 11, a data encryption module 13, a data storage module 15, a data access request module 17, a data decryption module 19 and a P2P network 20.

The difference from the system 1 for controlling transaction data access of FIG. 1 is that the data decryption module 19 is implemented within the P2P network 20 (for example, node 25). Accordingly, the data access request module 17 may request access to the transaction data to the transaction management module 11, and transmit the level key provided from the transaction management module 11 to the node 25.

The data decryption module 19 of the node 25 may decrypt the transaction data of the block B stored in the node 25 by using the level key provided from the transaction management module 11, and then transmit the restored transaction data to the data access request module 17.

On the other hand, unlike those shown in FIG. 1 or 6, at least one of the transaction management module 11, the data encryption module 13, the data storage module 15, the data access request module 17, and the data decryption module 19 may be implemented as a separate node outside the P2P network 20, may be implemented as a separate node inside the P2P network 20, may be implemented in at least one of the nodes 21, 23, 25, 27, 29 of the P2P network 20, may implemented in any element of the system for controlling transaction data access 1, or may be implemented at any location in the system for controlling transaction data access 1; and this may vary according to the specific implementation purpose of the system for controlling transaction data access 1.

Figure 7:
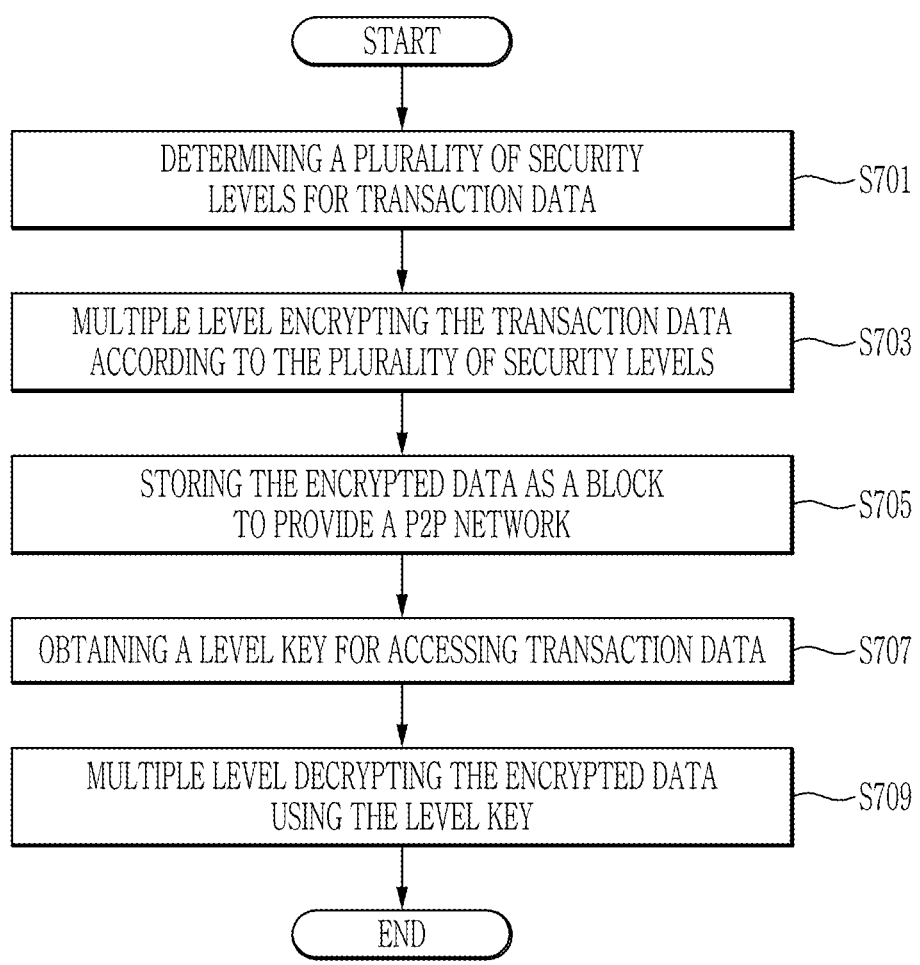
FIG. 7 is a flowchart illustrating a method for controlling transaction data access according to an embodiment of the present disclosure.

FIG. 7 is a flowchart illustrating a method for controlling transaction data access according to an embodiment of the present disclosure.

Referring to FIG. 7, a method for controlling transaction data access according to an embodiment of the present disclosure may include: determining a plurality of security levels for transaction data (S701), performing multiple level encrypting the transaction data according to the plurality of security levels (S703); and storing the encrypted data as a block to provide a P2P network (S705).

In some embodiments of the present disclosure, the transaction data may include a first data and a second data, the step S701 may include: determining the security level of the first data as a first security level, and determining the security level of the second data as a second security level; and step S703 may include: generating a first index based on the first data and the second data, generating a first data set by concatenating the first index with the first data and the second data, and generating a first encrypted data by encrypting the first index and the first data with a first public key corresponding to the first security level.

In some embodiments of the present disclosure, the step S703 may further include: generating a second index based on the first encrypted data and the second data, generating a second data set by concatenating the second index with the first encrypted data and the second data, and generating a second encrypted data by encrypting the second index, the first encrypted data, and the second data with a second public key corresponding to the second security level.

In addition, a method for controlling transaction data access according to an embodiment of the present disclosure may further include: obtaining a level key for accessing transaction data (S707), and performing multiple level decrypting the encrypted data using the level key (S709).

In some embodiments of the present disclosure, the level key may include a third level key, and the step S709, a third data set is obtained by decrypting the third encrypted data with a third level key, and the third data set is 3 It may include the step of separating the second encrypted data and restoring the third data based on the index.

In some embodiments of the present disclosure, the level key includes a second level key, and the step S709 may further include: obtaining a second data set by decrypting a second encrypted data with the second level key, separating a first encrypted data from the second data set based on a second index, and restoring a second data.

For more details on the method for controlling transaction data access, reference may be made to the above-described contents with reference to FIG. 1 to FIG. 6, and thus, a duplicate description will be omitted.

Figure 8:
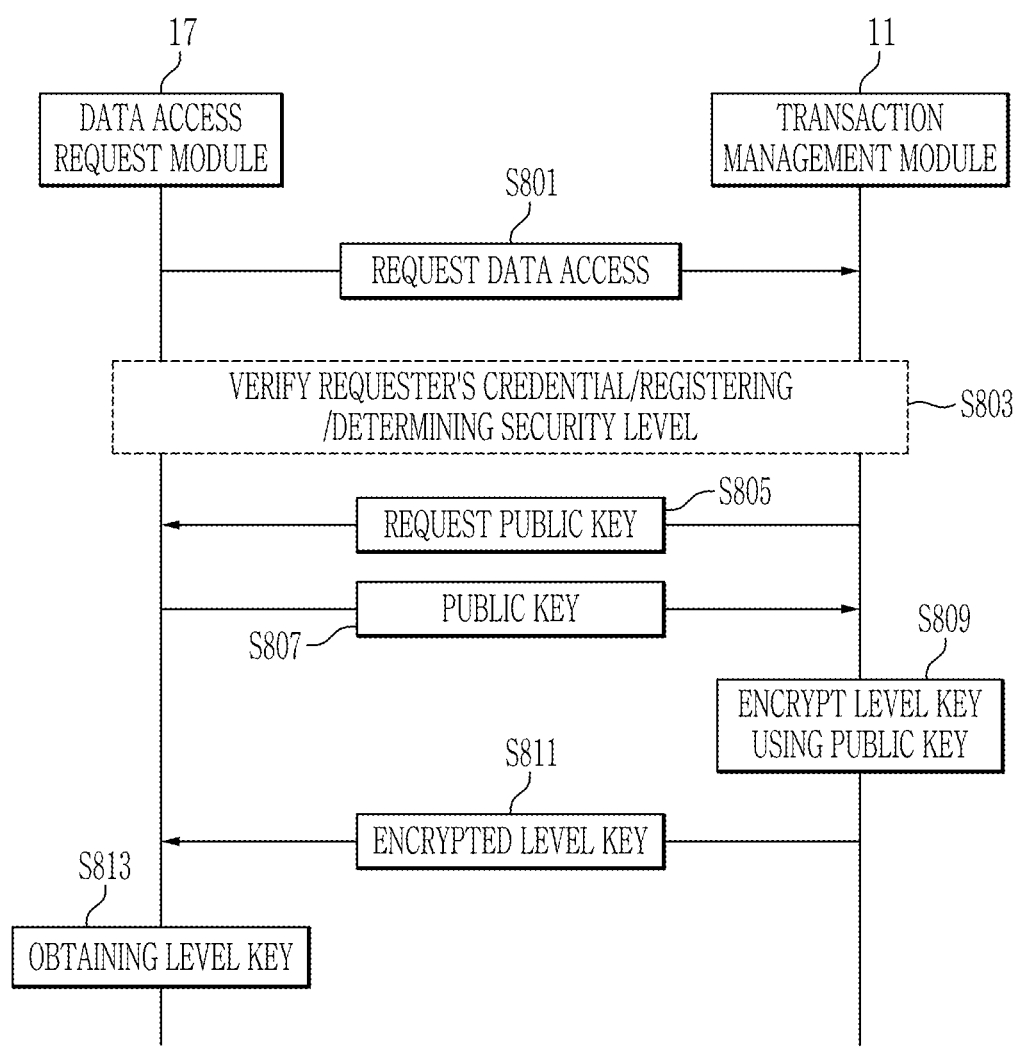
FIG. 8 is a flowchart illustrating a method for controlling transaction data access according to an embodiment of the present disclosure.

FIG. 8 is a flowchart illustrating a method for controlling transaction data access according to an embodiment of the present disclosure.

Referring to FIG. 8, in order for the data access request module 17 to obtain transaction data stored in a block of the P2P network, a method for controlling transaction data access according to an embodiment of the present disclosure may include transmitting a data access request to the transaction management module 11 (S801), and between the data access request module 17 and the transaction management module 11, verifying a credential of the requester, registering the requester, and determining security level (S803).

In addition, a method for controlling transaction data access according to an embodiment of the present disclosure may include, by the transaction management module 11, requesting a public key to the data access request module 17 (S805), and, in response, by the data access request module 17, providing a public key to the transaction management module 11 (S807).

In addition, a method for controlling transaction data access according to an embodiment of the present disclosure may include, by transaction management module 11, encrypting a level key corresponding to the security level determined by using the public key (S809), by transaction management module 11, transmitting the encrypted level key to the data access request module 17 (S811), and, by the data access request module 17, obtaining the level key (S813).

Here, when the security level for the data is determined, the transaction management module 11 may transmit not only a level key corresponding to the determined security level, but also a level key corresponding to a lower security level to the data access request module 17. For example, assuming that the first security level is the highest security level and the third security level is the lowest security level, when the data access request module 17 tries to access data corresponding to the third security level, the transaction management module 11 may transmit the third level key corresponding to the third security level to the data access request module 17, while when the data access request module 17 tries to access data corresponding to the first security level, the transaction management module 11 may transmit the first level key to the third level key corresponding to the first security level to the third security level to the data access request module 17, Accordingly, the data access request module 17 can obtain a level key according to the security level of the data to be accessed, and the data decryption module 19 may successfully restore the data to be accessed by the data access request module 17 using the level key.

Of course, the scope of the present disclosure is not limited to the present embodiment, and a method for the data access request module 17 to be provided a level key from the transaction management module 11 may be implemented in various ways.

Figure 9:
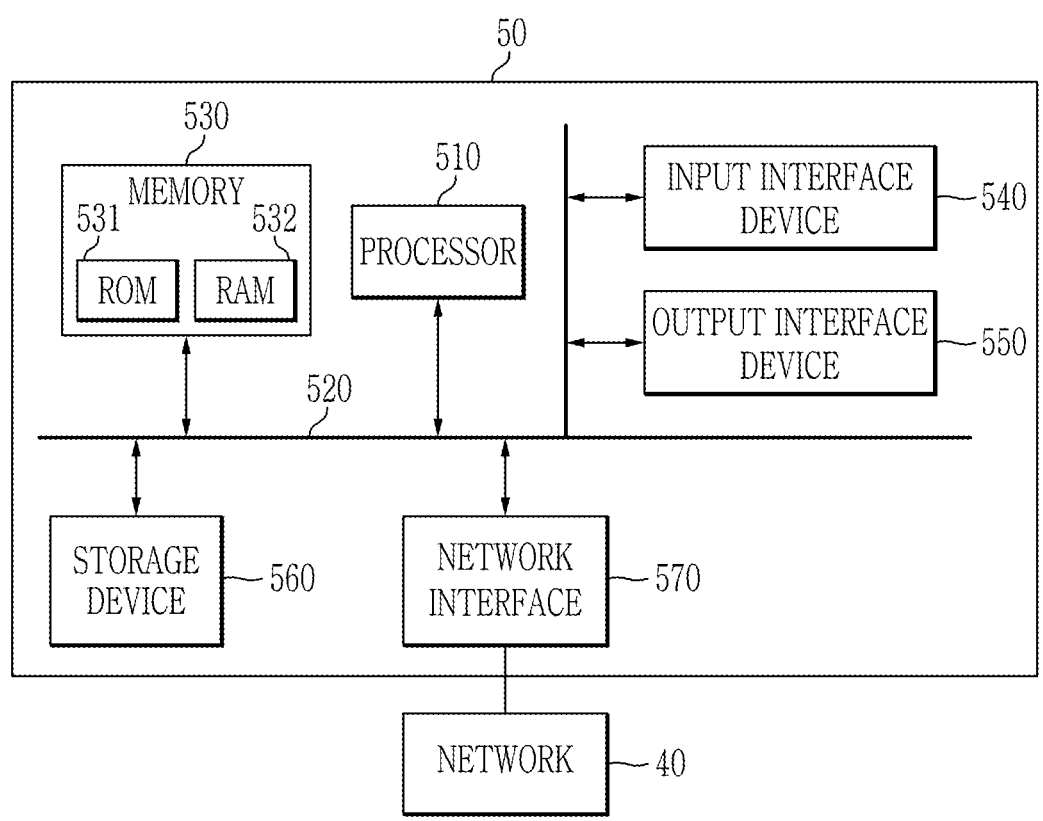
FIG. 9 is a block diagram of a computing device for implementing a system and a method for controlling transaction data access according to an embodiment of the present disclosure.

FIG. 9 is a block diagram of a computing device for implementing a system and a method for controlling transaction data access according to an embodiment of the present disclosure.

Referring to FIG. 9, a system and a method for controlling transaction data access according to an embodiment of the present disclosure may be implemented using a computing device 50.

The computing device 50 includes at least one of a processor 510, a memory 530, an input interface device 540, an output interface device 550, and a storage device 560 communicating through a bus 520. The computing device 50 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 8.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, at least some of a system and a method for controlling transaction data access according to embodiments of the present disclosure may be implemented as a program or software executed on the computing device 50, and the program or software may be stored in a computer-readable medium.

In addition, at least some of a system and a method for controlling transaction data access according to embodiments of the present disclosure may be implemented with hardware that can be electrically connected to the computing device 50.

According to the embodiments of the present disclosure described so far, in a situation in which all participating nodes share transactions, it is possible to increase the security for sensitive data such as personal information and confidential information that may be included in the transaction.

Also, according to embodiments of the present disclosure, by operating various security levels for sensitive data, transactions can be accessed only by users who have been granted permission according to the security levels. In addition, by diversifying the security levels within one data set, even if the sensitive data and general data are included in one data set, only sensitive data can be separately protected, so security policy can be operated in a sophisticated and detailed manner.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A system for controlling transaction data access, comprising:
   a transaction management module configured to determine a plurality of security levels for transaction data, using a processor;
   a data encryption module configured to perform multiple level encrypting the transaction data according to the plurality of security levels, using a processor; and
   a storage device configured to store the encrypted data as a block, and provide the block to a peer-to-peer (P2P) network,
   wherein performing the multiple level encrypting includes applying a first encryption to at least a portion of the transaction data and applying a second encryption to the transaction data including the at least a portion to which the first encryption has been applied, and
   wherein the first and the second encryptions correspond to different security levels.

2. The system of claim 1, wherein:
   the transaction data comprises a first data and a second data,
   the transaction management module determines the security level of the first data as a first security level, and determines the security level of the second data as a second security level, and
   the data encryption module generates a first index based on the first data and the second data, generates a first data set by concatenating the first index with the first data and the second data, and generates a first encrypted data by encrypting the first index and the first data with a first encryption key corresponding to the first security level.

3. The system of claim 2, wherein:
   the first index comprises information on a number of data in the first data set or a length of data.

4. The system of claim 2, wherein:
   the data encryption module generates a second index based on the first encrypted data and the second data, generates a second data set by concatenating the second index with the first encrypted data and the second data, and generates a second encrypted data by encrypting the second index, the first encrypted data, and the second data with a second encryption key corresponding to the second security level.

5. The system of claim 4, wherein:
   the transaction data further comprises a third data,
   the transaction management module determines the security level of the third data as a third security level, and
   the data encryption module generates a third index based on the second encrypted data and the third data, generates a third data set by concatenating the third index with the second encrypted data and the third data, and generates a third encrypted data by encrypting the third index, the second encrypted data, and the third data with a third encryption key corresponding to the third security level.

6. The system of claim 1, further comprising:
   a data access request module configured to send an access request for the transaction data to the transaction management module and receive a decryption key from the transaction management module, using a processor.

7. The system of claim 6, further comprising:
   a data decryption module configured to perform multiple level decrypting the encrypted data using the decryption key, using a processor.

8. The system of claim 7, wherein:
   the decryption key comprises a third decryption key, and
   the data decryption module obtains a third data set by decrypting a third encrypted data with the third decryption key, separates a second encrypted data from the third data set based on a third index, and restores a third data.

9. The system of claim 8, wherein:
   the decryption key comprises a second decryption key, and
   the data decryption module obtains a second data set by decrypting a second encrypted data with the second decryption key, separates a first encrypted data from the second data set based on a second index, and restores a second data.

10. The system of claim 9, wherein:
the decryption key comprises a first decryption key, and
the data decryption module obtains a first data set by decrypting a first encrypted data with the first decryption key, and restores a first data from the first data set based on a first index.

11. A system for controlling transaction data access comprising:
a data encryption module configured to perform multiple level encrypting the transaction data using a plurality of encryption keys, using a processor;
a storage device configured to store the encrypted data as a block, and provide the block to a P2P network; and
a data decryption module configured to perform multiple level decrypting the encrypted data using a plurality of decryption keys generated in a pair with the plurality of encryption keys, using a processor,
wherein performing the multiple level encrypting includes applying a first encryption to at least a portion of the transaction data and applying a second encryption to the transaction data including the at least a portion to which the first encryption has been applied, and
wherein the first and the second encryptions correspond to different security levels.

12. The system of claim 11, wherein:
the transaction data comprises a first data and a second data, and
the data encryption module generates a first encrypted data by encrypting the first data with a first encryption key, and generates a second encrypted data by encrypting the first encrypted data and the second data with a second encryption key.

13. The system of claim 12, wherein:
the data decryption module separates the first encrypted data by decrypting the second encrypted data with a second decryption key, and restores the second data.

14. The system of claim 13, wherein:
the data decryption module restores the first data by decrypting the first encrypted data with a first decryption key.

15. A method for controlling transaction data access comprising:
determining a plurality of security levels for transaction data;
performing multiple level encrypting the transaction data according to the plurality of security levels; and
storing the encrypted data as a block to provide the block to a peer-to-peer (P2P) network,
wherein performing the multiple level encrypting includes applying a first encryption to at least a portion of the transaction data and applying a second encryption to the transaction data including the at least a portion to which the first encryption has been applied, and
wherein the first and the second encryptions correspond to different security levels.

16. The method of claim 15, wherein:
the transaction data comprises a first data and a second data,
the determining the plurality of security levels comprises,
determining the security level of the first data as a first security level, and
determining the security level of the second data as a second security level, and
the performing multiple level encrypting comprises,
generating a first index based on the first data and the second data,
generating a first data set by concatenating the first index with the first data and the second data, and
generating a first encrypted data by encrypting the first index and the first data with a first encryption key corresponding to the first security level.

17. The method of claim 16, wherein:
the performing multiple level encrypting further comprises,
generating a second index based on the first encrypted data and the second data,
generating a second data set by concatenating the second index with the first encrypted data and the second data, and
generating a second encrypted data by encrypting the second index, the first encrypted data, and the second data with a second encryption key corresponding to the second security level.

18. The method of claim 16, further comprising:
performing multiple level decrypting the encrypted data using the decryption key.

19. The method of claim 18, wherein:
the decryption key comprises a third decryption key, and
the performing multiple level decrypting further comprises,
obtaining a third data set by decrypting a third encrypted data with the third decryption key, separating a second encrypted data from the third data set based on a third index, and restoring a third data.

20. The method of claim 19, wherein:
the decryption key comprises a second decryption key, and
the performing multiple level decrypting further comprises,
obtaining a second data set by decrypting a second encrypted data with the second decryption key, separating a first encrypted data from the second data set based on a second index, and restoring a second data.

* * * * *